United States Patent
Le Paih et al.

(10) Patent No.: US 9,499,352 B2
(45) Date of Patent: Nov. 22, 2016

(54) DEVICE FOR FORMING PRODUCT BATCHES IN ORDER TO LOAD SAME IN RECEPTACLES

(75) Inventors: Jacques Le Paih, Plumeliau (FR);
Laurent Le Goff, Vannes (FR);
Fabrice Le Pabic, Camors (FR)

(73) Assignee: MAREL STORK FOOD SYSTEMS FRANCE SAS, Baud (FR)

( * ) Notice: Subject to any disclaimer, the term of this patent is extended or adjusted under 35 U.S.C. 154(b) by 59 days.

(21) Appl. No.: 13/502,516

(22) PCT Filed: Oct. 18, 2010

(86) PCT No.: PCT/EP2010/065657
§ 371 (c)(1),
(2), (4) Date: Apr. 17, 2012

(87) PCT Pub. No.: WO2011/048059
PCT Pub. Date: Apr. 28, 2011

(65) Prior Publication Data
US 2012/0199440 A1    Aug. 9, 2012

(30) Foreign Application Priority Data
Oct. 19, 2009   (FR) ...................................... 0905011

(51) Int. Cl.
*B65G 47/52* (2006.01)
*B65G 47/08* (2006.01)
*B65B 35/44* (2006.01)
(Continued)

(52) U.S. Cl.
CPC ............. *B65G 47/082* (2013.01); *B65B 35/44* (2013.01); *B65G 47/261* (2013.01); *B65G 47/5127* (2013.01); *B65G 47/52* (2013.01)

(58) Field of Classification Search
CPC .... B56G 47/082; B56G 47/08; B56G 47/02; B65G 47/082; B65G 47/26; B65B 35/44
USPC .................................. 198/426, 429, 430, 431
See application file for complete search history.

(56) References Cited

U.S. PATENT DOCUMENTS 4,162,723 A *  7/1979  Kupper ................. B65G 17/002
                                                    198/444
5,127,209 A *  7/1992  Hunter .................... B65B 35/44
                                                    198/419.3
(Continued)

FOREIGN PATENT DOCUMENTS

DE          3238888 A1      4/1984
EP          0266489 A1      5/1988
(Continued)

*Primary Examiner* — Thomas Randazzo
(74) *Attorney, Agent, or Firm* — Zarley Law Firm, P.L.C.

(57) ABSTRACT

The present invention relates to a device for forming batches of products to be loaded into receptacles, including: a conveyer having housings including two links supporting a plurality of pallets defining housings between same: a supply conveyer arranged substantially perpendicular to the housing conveyer and capable of transporting products one behind the other and of supplying at least one product in each housing to a loading station via one Open lateral side of said housings, the housing conveyer being provided with abutment means arranged on the lateral side of the housing opposite the supply conveyer and used as an abutment for the product to be loaded into each housing: and unloading means capable of simultaneously unloading a batch of products from a series of housings of the housing conveyer at an unloading station.

15 Claims, 6 Drawing Sheets

(51) Int. Cl.
*B65G 47/26* (2006.01)
*B65G 47/51* (2006.01)

(56) References Cited

U.S. PATENT DOCUMENTS

| | | | | |
|---|---|---|---|---|
| 5,261,522 A | * | 11/1993 | Guttinger | B65G 47/5122 198/429 |
| 5,460,258 A | * | 10/1995 | Tisma | B65G 47/31 198/429 |
| 5,611,418 A | * | 3/1997 | Helmstetter | B65G 47/5122 198/347.1 |
| 5,618,229 A | * | 4/1997 | Le Paih | A22C 11/006 452/46 |
| 5,755,317 A | * | 5/1998 | Holston | B65G 47/082 198/484.1 |
| 5,794,756 A | * | 8/1998 | Taylor | B65G 43/10 198/429 |
| 5,897,292 A | * | 4/1999 | Gerwe | B65G 47/082 198/374 |
| 6,019,213 A | * | 2/2000 | Schubert | B65G 17/26 198/419.3 |
| 7,069,845 B2 | * | 7/2006 | Righele | B65B 19/34 99/353 |
| 7,726,096 B2 | * | 6/2010 | Guttinger | B65B 5/04 198/867.11 |
| RE41,573 E | * | 8/2010 | Sanchez et al. | 426/496 |
| 8,453,822 B2 | * | 6/2013 | Hart | B65G 47/5127 198/418.6 |
| 8,490,775 B2 | * | 7/2013 | Volk | B65G 17/26 198/419.3 |
| 8,583,279 B2 | * | 11/2013 | Fecht | B65B 35/44 198/347.1 |
| 2011/0079490 A1 | * | 4/2011 | Kelly | B65B 35/44 198/418 |

FOREIGN PATENT DOCUMENTS

| | | |
|---|---|---|
| EP | 0551613 A1 | 7/1993 |
| JP | 83571 U | 1/1947 |
| JP | 39115 A | 2/1993 |
| JP | 254515 A | 5/1993 |
| JP | 519302 A | 10/2001 |
| WO | 9918019 A1 | 4/1999 |

* cited by examiner

DEVICE FOR FORMING PRODUCT BATCHES IN ORDER TO LOAD SAME IN RECEPTACLES

BACKGROUND OF THE INVENTION

The present invention concerns a device for forming product batches in order to load them in receptacles, in particular for forming batches of food products, especially sausages, intended to be loaded in trays.

Devices for forming product batches are known, comprising a first conveyor with housings comprising two endless belts guided on return members with horizontal rotation axes, on a circulation path, and carrying a plurality of blades defining between them housings each able to be loaded with at least one product at a loading station in the circulation path, and be unloaded at a unloading station in the circulation path, and a second endless belt conveyor able to transport products one behind the other, and to bring one or more products in each housing in the conveyor with housings at the loading station. These devices also comprise unloading means able to simultaneously unload a batch of products from successive housings in the conveyor with housings at the unloading conveyor, in order to load them in a receptacle. In these devices, the second endless belt conveyor is disposed parallel to the conveyor with housings, and transfers the products through the open exterior side of the housings defined between the exterior transverse edges of the blades.

These devices are conventionally used for flat and/or robust products and/or ones having a certain rigidity, for example of the newspaper or journal type. These devices do however prove to be unsuitable for certain types of product. In addition, these devices do not allow a precise transverse positioning of the products in the housings.

The aim of the present invention is to propose a solution aimed at overcoming the aforementioned drawbacks.

SUMMARY OF THE INVENTION

To this end, the present invention proposes a device for forming product batches, said batches being intended to be loaded in receptacles, in particular batches of food products, especially sausages, in order to load them in trays, comprising
  a first conveyor of the housing type comprising two endless belts guided on return members with horizontal rotation axes, on a circulation path, and carrying a plurality of blades defining housings between them, each housing being able to be loaded with at least one product at a loading station in the circulation path and be unloaded at an unloading station in the circulation path, and drive means able to drive said belts along the circulation path,
  a second so-called feed conveyor of endless belt type comprising a first endless belt able to transport products separated from one another and one behind the other, and to bring one or more products in each housing of the housing conveyor at the loading station, and second drive means able to drive said first endless belt, and
  unloading means able to simultaneously unload a batch of products from successive housings on the housing conveyor at the unloading station, in order to load them in a receptacle,
  characterised in that said feed conveyor is arranged substantially perpendicular to the housing conveyor and is able to bring the products in the housings through an open lateral side of said housings,
  the housing conveyor being equipped with stop means able to be arranged on the lateral side of the housing opposite to the feed conveyor when one or more products are loaded in said housing, to serve as a stop for said product or products to be loaded in each housing; said stop means are for example able to substantially close each housing on the lateral side of the housing opposite to the feed conveyor when one or more products are loaded in said housing.

According to the invention, the loading of the housing conveyor is performed laterally from the lateral side of the housing, which makes it possible to load different types of product, especially elongate products, in particular non-rigid, such as food products such as sausages, in a precise transverse position in the housings.

According to one particularity, said feed conveyor comprises a downstream end portion with a length extending between the two belts of the main conveyor, so that each product is driven positively in a housing, until it abuts against the stop means. Such a downstream end portion guarantees correct positioning of the product in the housing, with a precise transverse position in the housing, in particular in the case of flexible and fragile products, such as sausages, making it possible to form batches of products that are perfectly aligned, easily entering receptacles without being damaged.

According to one embodiment, the filling station is defined at a return member, the blades being fixed rigidly to the belts so that the two successive blades of a housing separate from each other when the belts pass over said return member, in order to open the housing and thus facilitate the insertion of one or more products, moving closer together on leaving the return member.

According to one embodiment, the blades of a housing are able to grip the product or products loaded in the housing after the belts pass over the return members. In the case of sausages, the sausages can then be extracted from the housings in order to be placed directly edge to edge in trays, without requiring an intermediate restacking step.

According to one embodiment, the housing conveyor comprises the belts guided on a circulation path in a triangle by two main return members and an intermediate return member, the loading station being defined at said intermediate return member, the feed conveyor being able to bring the products in the housings when they pass over said intermediate return member. This arrangement makes it possible to provide a space for positioning said downstream end portion and to keep a loading station fixed when the two return members are moved to and fro in order to carry out unloading at rest, as described below.

According to one embodiment, said intermediate return member is arranged above the main return members, said intermediate return member comprising, for each belt, an intermediate wheel, the feed conveyor comprising a main top-length portion arranged substantially parallel to the rotation axes of the intermediate wheels, above said wheels, said downstream end portion being arranged between the two return wheels, under the blades.

According to one embodiment, the feed conveyor comprises a single endless belt, the top length of which comprises said main portion and said downstream end portion. The endless belt is advantageously formed from several belts arranged edge to edge, only a part of the belts constituting the main portion being used for forming the downstream end part.

According to one embodiment, the feed conveyor also comprises two second endless belts, mounted between return wheels with vertical rotation axes, functioning in synchronism with the first belt, and having lateral lengths facing each other, close to the downstream main roller, able to grip the products.

According to one embodiment, the main conveyor comprises a rectilinear unloading length defined between the two main return members, said housing conveyor comprising movement means able to move said main return members in a to-and-fro movement, parallel to the unloading length, in order to stop said unloading length when batches of products are unloaded by said unloading means, while continuing the loading of the products in the housings.

According to one embodiment, the unloading means comprise a pusher able to pass through the open internal sides of the housings in order to push the products.

According to one embodiment, the stop means are adjustable in transverse position.

According to one embodiment, the batch forming device comprises a third so-called output conveyor, with an endless belt, arranged under the unloading station, parallel or perpendicular to the housing conveyor, intended to receive on its top length the batches of products, directly or indirectly via receptacles.

According to one embodiment, the device comprises a sensor able to detect a product leaving the feed conveyor, the means of driving the belts of the housing conveyor being slaved to said sensor.

BRIEF DESCRIPTION OF THE DRAWINGS

The invention will be better understood and other aims, details, features and advantages will emerge more clearly during the detailed explanatory description that follows of a currently preferred particular embodiment of the invention, with reference to the accompanying schematic drawings, in which.

DETAILED DESCRIPTION OF THE PREFERRED EMBODIMENT

The figures illustrate a batch forming device 1 for loading batches of sausages in trays B. The device according to the invention is for example arranged downstream of a sausage manufacturing machine, such as the one described in the patent document FR 2 725 876.

The device comprises a feed conveyor 2, a housing conveyor 5 and a discharge conveyor 8 for conveying trays.

Figure 4:
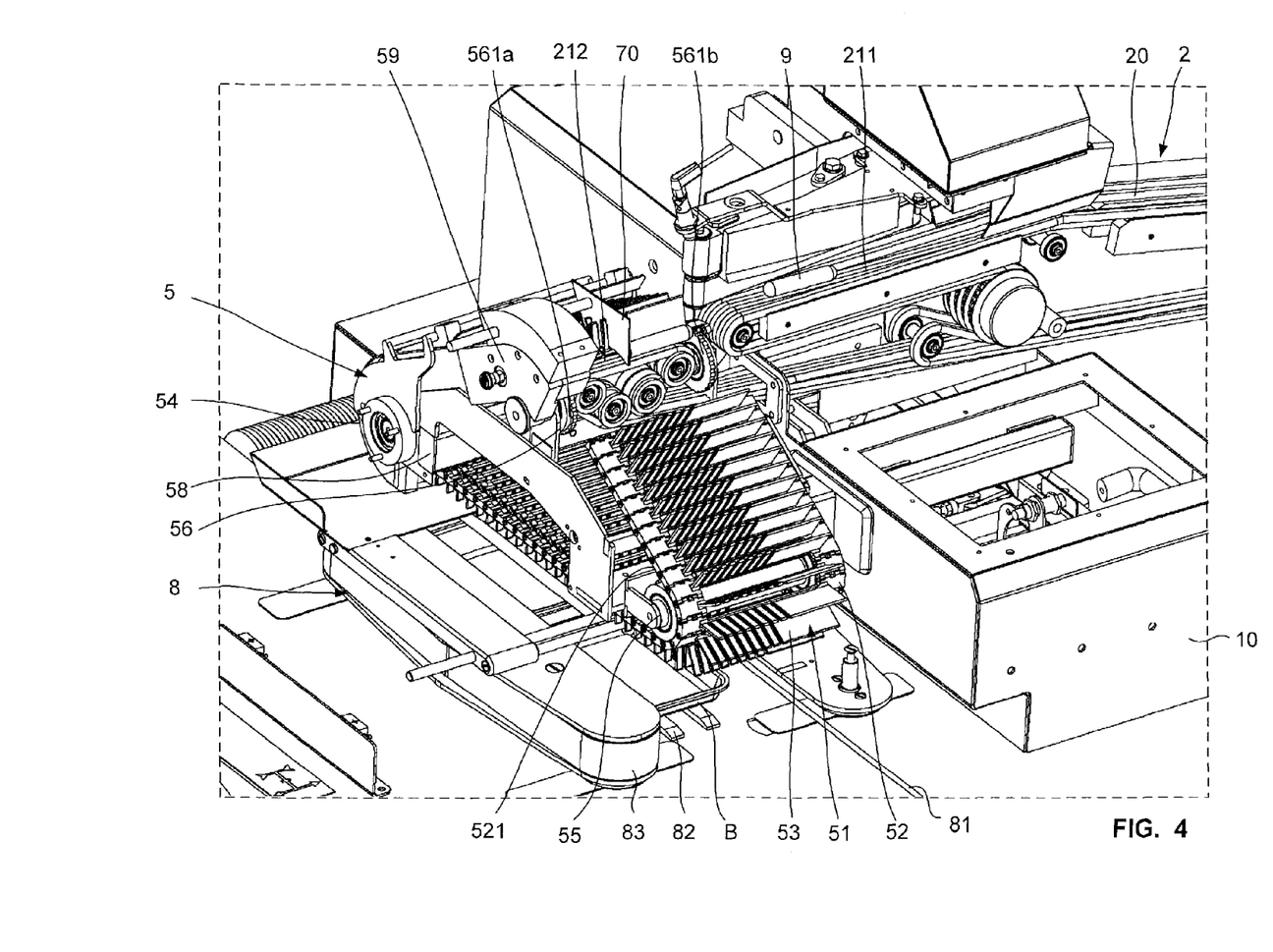
FIG. 4 is an enlarged partial perspective view of the device of FIG. 1, in which elements of the housing conveyor and of the feed conveyor have been removed.

With reference to FIGS. 2 to 6, and in particular FIG. 4, the housing conveyor 5 comprises a pair of endless belts 52 spaced apart from each other and parallel to each other, carrying blades 53 that delimit individual housings 51 between them. The belts are mounted on two main return members 54, 55 and an intermediate return member 56 so that the belts are moved on a circulation path in a triangle.

The belts 52 consist of chains formed by links 521 articulated to each other, each blade 53 is formed by a rectangular plate that is mounted on a link in each chain. The blades are rigidly fixed to the links and extend outwards substantially at 90° to the links. Each housing 51 is delimited between two successive parallel blades and has an open exterior side defined between the two exterior transverse edges 531 of the blades, an open bottom side defined between the two interior transverse edges 532, and two open lateral sides, a first one defined between the two lateral edges 533 and a second defined between the two lateral edges 534.

Figure 2:
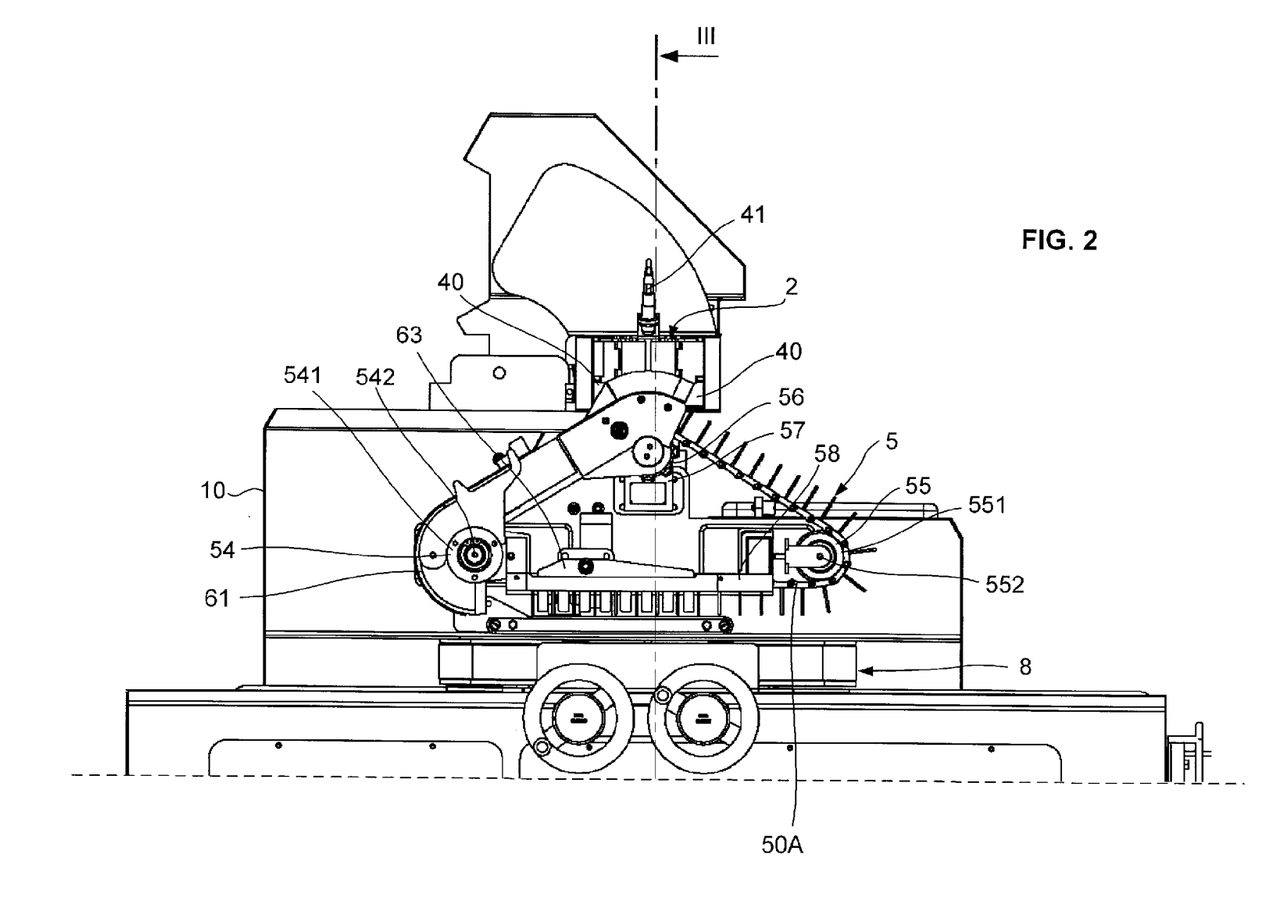
FIG. 2 is a partial side view of the device of FIG. 1.
Figure 3:
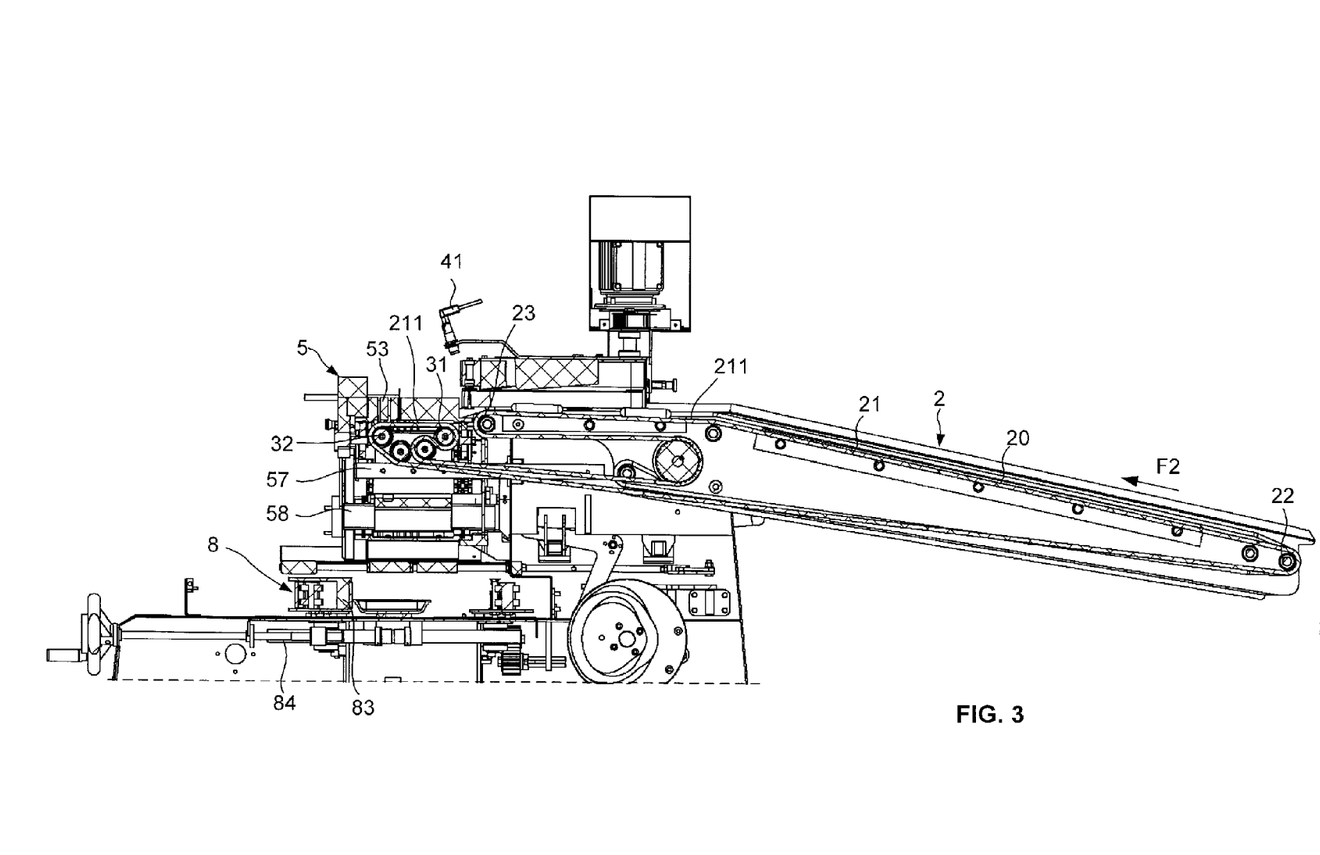
FIG. 3 is a partial view in section along the plane III-III in FIG. 2.

According to FIG. 2, the main return members 54, 55 comprise two upstream notched wheels 541 secured to a first spindle 542 and two downstream notched wheels 551 secured to a second spindle 552. The intermediate return member 56 comprises two intermediate notched wheels 561a, 561b, Each belt 52 meshes on an intermediate wheel, an upstream wheel and a downstream wheel. The first spindle 542 of the upstream wheels and the second spindle 552 of the downstream wheels are mounted rotatably on a first support 58, which is mounted so as to be able to move in horizontal translation on the frame 10 of the batch forming device. The intermediate wheels are mounted rotatably on a second support 57, independently of each other, above the upstream and downstream pairs of wheels, said second support 57 being mounted fixedly on the frame 10. The so-called unloading length 50A of the conveyor 5, which is defined between the two pairs of upstream and downstream wheels, is arranged substantially horizontally.

Figures 7A, 7B, 7C:
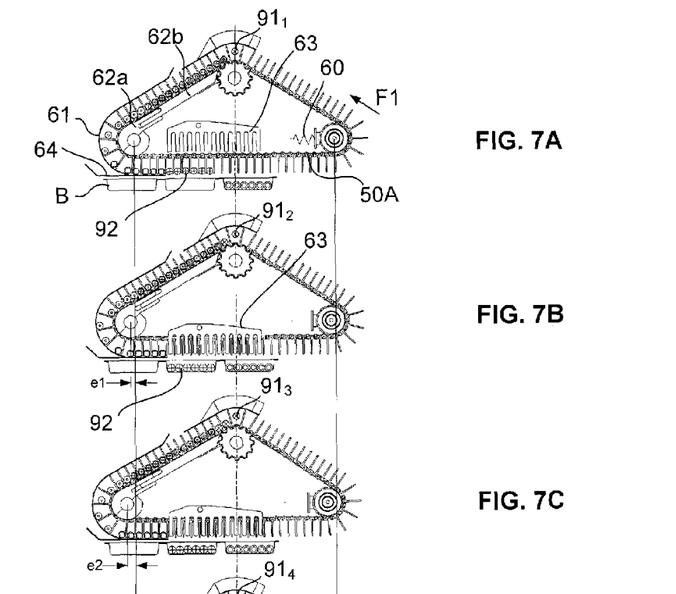
FIG. 7A to 7G are different schematic side views of the housing conveyor, illustrating the various steps for the continuous loading of six sausages and the unloading of a batch of six sausages in a tray at rest.
Figures 7D, 7E:
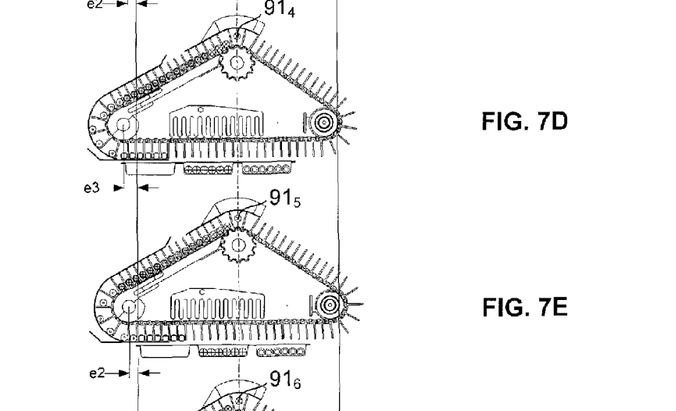

Movement means (not shown), mounted between the frame 10 and the first support 58, are able to move the first support 58 in horizontal translation with respect to the frame, in a to-and-fro movement, between a so-called reference position illustrated in FIG. 7A and an extreme position illustrated in FIG. 7D. First drive means 59, acting for example on the intermediate wheel 561a opposite to the feed conveyor 2, are able to rotate the chains carrying the blades in the anticlockwise direction, as illustrated by the arrow reference F1 in FIG. 7A. In the reference position, the upstream and downstream pairs of wheels are arranged substantially symmetrically on either side of the intermediate wheels, the circulation path being substantially in an isosceles triangle. The first drive means and the movement means function in synchronism, so that the unloading length 50A is at rest while the first support 58 carrying the upstream and downstream wheels is moving towards its extreme position. During this movement, the triangle of the circulation path deforms. To guarantee an identical length of circulation path when the triangle deforms, the second spindle of the downstream wheels is mounted on the first support 58 by means of an elastic system 60, illustrated schematically in FIG. 7A, enabling said spindle to move in horizontal translation with respect to its support 58.

The housing conveyor has a loading station where the loading of the sausages takes place and an unloading station arranged at the unloading length 50A where the unloading of the sausages from the housings takes place. Between two return members, and in particular at the unloading length, the blades are arranged parallel to one another. When the belts pass over the return members, the blades separate, as can be seen in the figures. The separation pitch e2 between two successive blades is defined so that each sausage placed in a housing is gripped between the two blades when the latter are parallel to each other, and the loading station of the housing conveyor is defined at the intermediate wheels, when the two blades of a housing are furthest apart. To hold the sausages in the housings when the belts pass over the upstream wheels, a curved cowling 61 is mounted on the first support 58 in order to close off the external side of the housings defined between the external transverse edges 531 of the blades. To guarantee the holding of the sausages in the housings along the length of the conveyor defined between the intermediate wheels and the upstream wheels, flat cowlings 62a, 62b are mounted on the first support and on the second support in order to close off the internal side of the housings defined between the internal transverse edges 532 of the blades.

At the unloading station, the conveyor comprises unloading means 63 formed by a pusher comprising a base carrying a plurality of bars. The pusher is mounted so as to be able to move in vertical translation on the first support, between a high retracted position illustrated in FIG. 7a, in which the pusher is placed above the unloading length, between the two chains, and a low active position, illustrated in FIGS. 2, 7B and 7C, in which the bars of the pusher enter the housings in order to push the sausages out of the housings, downwards, into trays B positioned on the discharge conveyor 8. To guarantee holding of the sausages in the housings along the unloading length upstream of the loading station, a cowling 64 is mounted on the second support 57 in order close off the internal side of the housings. At the loading station, a hatch system 65 (FIG. 3) may be provided, movable between a closed position, to close off said internal sides when the pusher is in the retracted position, and an open position to enable the sausages to be unloaded by the pusher in the active position.

The feed conveyor 2 comprises a first endless belt 20 receiving, on its top length 21, the sausages 9 emerging from a manufacturing machine. This feed conveyor transports the longitudinally oriented sausages 9 in the direction F2, one behind the other. The feed conveyor, arranged perpendicular to the housing conveyor, places the sausages in the housings 51.

With reference to FIGS. 3 to 6, the first endless belt comprises a top length portion 211, referred to as the main portion, for bringing the sausages in the housings through an open lateral side of the housings at the loading station, and a top length portion 212, referred to as the downstream end, arranged between the two chains 52, under the internal transverse edges 532 of the blades 53. The main portion 211 and the downstream end portion 212 are centred on the same vertical plane passing through the rotation axes of the intermediate wheels 561a, 561b, the two portions 211, 212 being separated from each other by a sufficient distance for the positioning between them of the intermediate wheel 561b.

The main portion 211 is defined between an upstream main roller 22 and a downstream main roller 23, these two rollers being mounted rotatably on a chassis 24 of the feed conveyor about a horizontal axis. The chassis of the feed conveyor is mounted on the frame of the device, so that the axis of the downstream main roller is placed parallel to the chains 52 of the housing conveyor, the endless belt that passes over the downstream roller being arranged close to the intermediate wheel 561b without contact with the latter. At said downstream main roller 23, the main portion 211 extends substantially horizontally, and above the level of the chain passing over the intermediate wheel 561b.

The end portion 212 is defined between an upstream secondary roller 31 and a downstream secondary roller 32, with horizontal rotation axes, perpendicular to the axes of the intermediate wheels 561a, 561b.

After passing over the upstream main roller 23, the endless belt passes over an intermediate main roller 25 arranged between the upstream and downstream main rollers 22, 23, and then passes over a first intermediate secondary roller 33, before passing over the upstream secondary roller, said first intermediate secondary roller 33 being arranged between and below the upstream and downstream secondary rollers 31, 32.

The main intermediate roller 25 and the first intermediate secondary roller 33 are arranged so that the belt length defined between them can pass under the intermediate wheel 561b. At the exit from the first intermediate secondary roller, the belt passes over a second intermediate secondary roller 34 in order to return in the direction of the upstream main roller 22, passing under the intermediate main roller 25.

Figure 6:
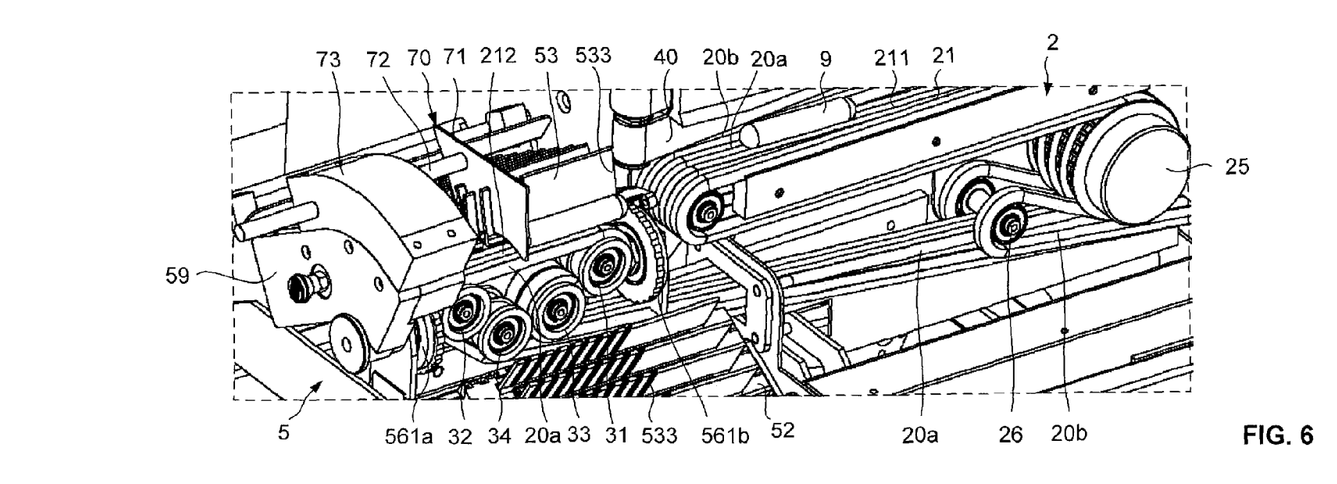
FIG. 6 is a partial enlarged view of FIG. 4.

With reference to FIG. 6, at the main portion 211, the endless belt is formed by four belts arranged edge to edge, including two so-called lateral belts 20b, placed on either side of two central belts 20a, At the downstream end portion 212, the belt is formed solely by two central belts. At the exit from the intermediate main roller 25, only the two central belts 20a are directed in the direction of the secondary rollers, the two lateral belts 20b passing over main return wheels 26 in order then to pass directly over the upstream main roller 22. Second drive means, acting for example on the intermediate main roller 25, drive the first endless belt 20 continuously, in the direction F2.

In a variant, the main portion 211 and the downstream end portion are obtained by using two separate endless belts.

Figure 1:
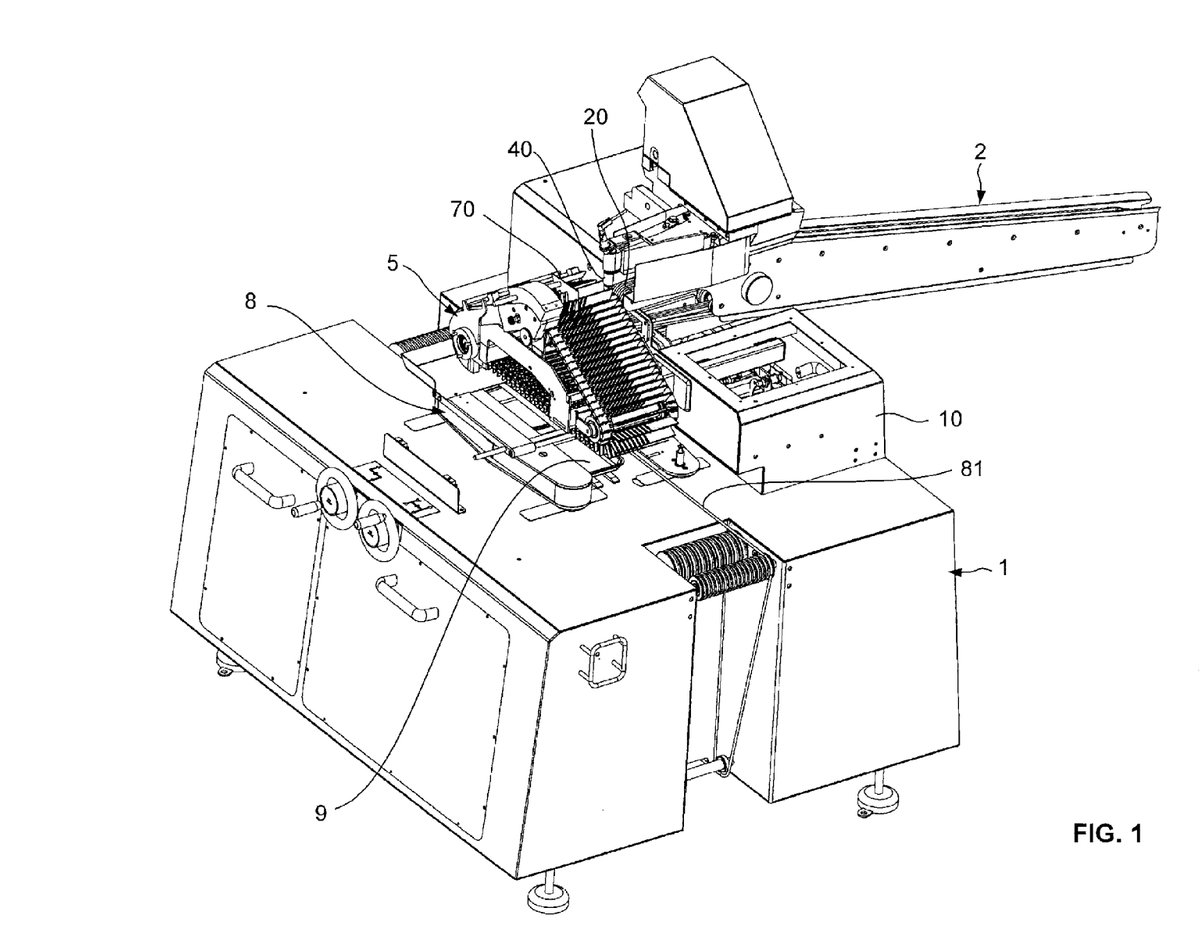
FIG. 1 is perspective view of a batch forming device according to the invention.

The feed conveyor also comprises two second endless belts 40, only one of which is shown in FIG. 1, mounted between upstream and downstream return wheels, with vertical rotation axes, and having lateral lengths arranged opposite each other, on either side of the main portion 211 of the top length of the first belt, close to the downstream main roller 23. The separation of the two belts can advantageously be adjusted so as to be adapted to the cross section of the sausages, in order to grip them lightly between the two facing lengths. These second belts are driven by third drive means so that said opposite lengths move substantially at the same speed as the main portion of the top length of the first belt. These second belts centre the sausages on the main portion, provide longitudinal positioning of the sausages, which have a natural tendency to curve in the case of natural casings, and guarantee good projection of the sausages into the housings from said main portion.

Figure 5:
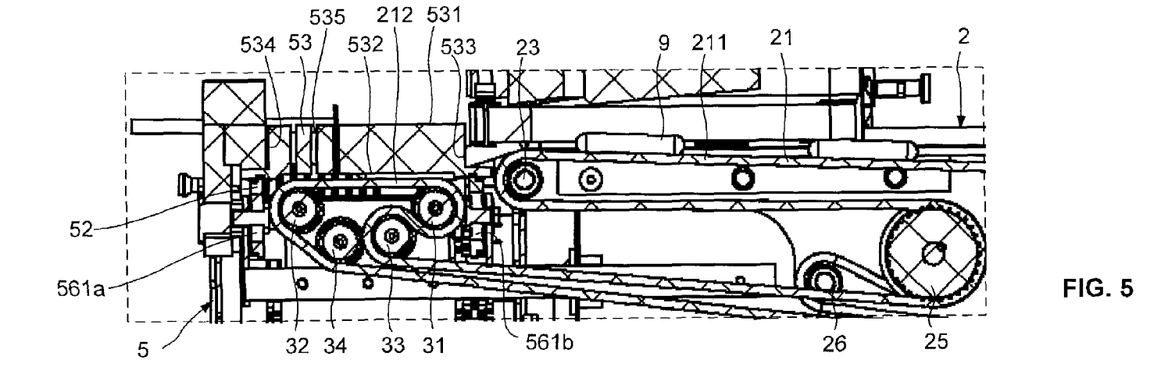
FIG. 5 is a partial enlarged view of FIG. 3.

The loading station of the housing conveyor comprises stop means 70 comprising a plate 71 mounted perpendicularly to the blades in order to close off the lateral side of each housing that is opposite to the feed conveyor. The plate can be mounted fixedly on the second support 57 of the housing conveyor in different positions, offset transversely from one another. The blades 53 are provided with several slots 535 corresponding to these various transverse positions of the plate, the plate being inserted in slots of the blades passing at the loading station when the chains are driven. Only a few slots are shown in FIG. 5 for reasons of clarity.

The plate 71 is mounted fixedly on the second support, above the downstream end portion 212, via a transverse rod 72 mounted slidably on a support 73 assembled removably on the second support or on the frame, above the intermediate wheel 561a.

With reference in particular to FIG. 4, the batch forming device also comprises a discharge conveyor 8 for transporting trays B arranged one behind the other, comprising a first endless belt 81 comprising a top length extending under the unloading length 50A parallel to the latter. This endless belt is formed by a plurality of cables, only one of which is shown in the figures, guided on rollers mounted rotatably on the frame 10 around axes parallel to the rollers of the housing conveyor. This endless belt is driven continuously via fourth drive means. At the discharge station, the discharge conveyor comprises two longitudinal rails 82 offset transversely from each other, passing between the cables, and the top edges of which are arranged above said cables. The discharge conveyor also comprises two second endless belts 83, only one of which is shown in the figures, mounted between upstream and downstream return wheels with vertical rotation axes, and having lateral lengths placed opposite each other above the top length of the first belt 81, on either side of the longitudinal rails. The discharge conveyor advantageously comprises an adjustment system 84 for adjusting the transverse position of each lateral length as well as the separation between the two lateral lengths, according to the adjustment of the transverse position of the aforementioned plate 71, in order to adapt the device to different types of tray and different lengths of sausage. These second belts are driven by fifth drive means, so that said opposite lateral belts move substantially at the same speed as the top length of the first belt 81. The second belts are adjusted so as to wedge the trays transversely and grip them between the facing lengths in order to move them step by step. The first endless belt functions continuously in order to bring the trays as far as the rails and then discharge them at the exit from the rails, the second belts functioning in step by step, in order to move the trays, which rest on the rails, one after the other, under the loading station of the housing conveyor.

The device according to the invention comprises a control unit able to control the drive means of the first belt 20 and the second belts 40 of the feed conveyor 2, the drive means of the housing conveyor 5 and the means of moving its first support 58 for the main rollers, its pusher 63 and any hatch system 65, and the means of driving the second belts 83 of the discharge conveyor.

A description of the functioning of the batch forming device according to the invention will now be given.

The feed conveyor 2 receives, on the main portion 211 of the top length of its first belt, on the same side as its main upstream roller 22, the sausages 9 emerging from a manufacturing machine. Each sausage carried on said main length is gripped between the two lateral lengths of the second belts 40 and ejected into a housing 51 placed opposite said main portion. The sausage passes between the two lateral edges 533 of the blades, and comes onto the downstream end portion 212 of the top length, which is arranged between the two blades of the housing. The sausage is then moved positively by this end portion until it comes into abutment against the plate 71. As the chains 52 advance, the blades defining the housing approach each other and grip the sausage, and the following empty housing arrives at the loading station in order to be loaded with the following sausage transported by the feed conveyor.

FIGS. 7A to 7G illustrate the various steps of a cycle of loading six sausages at the loading station and unloading a batch of six sausages at the unloading station.

In FIG. 7A the pairs of main wheels are in their reference position, arranged symmetrically on either side of the fixed intermediate wheels. An empty tray B is placed at rest at the filling station, under the pusher in the retracted position, and a first sausage $91_1$ arrives to be loaded at the loading station.

The chains carrying the blades are moved by a distance e2 corresponding to the separation pitch between two successive parallel blades, until the following empty housing is brought to the loading station for loading a second sausage $91_2$. During this movement of the chains over this distance e2, the first sausage $91_1$ is loaded in a housing and the first support carrying the pairs of upstream and downstream rollers is moved in horizontal translation towards the left by a distance e1, corresponding to a half pitch. This horizontal translation movement has the effect of stopping the movement of the unloading length 50A. The six sausages 92 placed in the housings positioned in line with the pusher 63 are then ejected out of the housings by movement of the pusher into the low position and fall by gravity into the tray, as illustrated in FIG. 7B.

During the following movement of the chains by a distance e2 for loading a third sausage $91_3$, the first support is moved towards the left by a half pitch in order to keep the unloading length stopped, with the pusher in the active position, as illustrated in FIG. 7C.

During the following movement of the chains by distance e2 for loading a fourth sausage $91_4$, the first support is moved towards the left by a half pitch in order to keep the unloading length stopped and to enable the pusher to return to the high position, as illustrated in FIG. 7D. The first support is then shifted towards the left by a distance e3 corresponding to 3/2 pitches. Simultaneously, the second belts of the discharge conveyor are driven so as to bring an empty tray under the pusher.

Figures 7F, 7G:
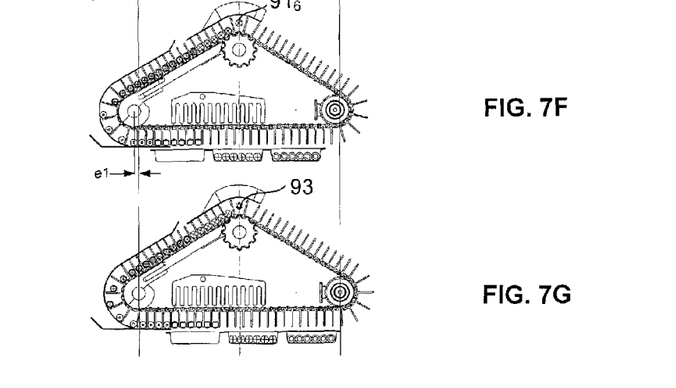

During following movements over a distance corresponding to three pitches, the fifth and sixth sausages $91_5$, $91_6$ are loaded into housings, another sausage 93 arrives at the loading station, and the first support is moved in translation to its reference position, as illustrated in FIGS. 7E to 7G, the position of the housing conveyor in FIG. 7G being identical to that in FIG. 7A. This translation movement combined with the movement of the chains has the effect of moving the loading length by six pitches towards the right and thus bringing six housings loaded with sausages to the pusher. Moreover, an empty tray is brought under the pusher.

A simple parameterising of the device makes it possible to modify the number of sausages per batch. By way of example, by providing a pusher with twelve bars, as illustrated in the figures, batches of twelve sausages can be formed by keeping, from the position illustrated in FIGS. 7A to 7G, a first support in its reference position during the movement of the chains over six additional pitches, and then effecting the cycle described in FIGS. 7B to 7F.

At the discharge from the sausage manufacturing machine, the sausages are arranged longitudinally one behind the other, with a longitudinal separation between two successive sausages that is substantially constant. In normal operation, the chains of the housing conveyor are driven continuously, substantially at a constant speed. To guarantee loading of all the housings of the conveyor passing at the loading station, in particular in the case of an irregular supply of sausages from the feed conveyor, the feed conveyor advantageously comprises a sensor 41 able to detect the presence of a sausage leaving the main portion 211. The driving of the chains of the housing conveyor is then slaved to the output signal of this sensor, and can be slowed and optionally stopped according to variations in separation between two successive sausages on the feed conveyor.

According to variant embodiments, several sausages can be loaded in each housing. In this case, the stop means advantageously comprise one or more additional stops able to be inserted at the loading station in the housing, after the insertion of a sausage, against which the following sausage loaded in the housing comes into abutment. The device according to the invention can of course be used for loading other types of product in receptacles, for example meatballs.

According to variant embodiments, the sausages fall directly onto the length of a discharge conveyor, formed for example by a single continuous endless belt, arranged parallel or perpendicular to the unloading length of the housing conveyor.

According to a variant embodiment, the circulation path is in a triangle, and the loading takes place as before, laterally, at the intermediate member, but the latter is arranged below the main members. The downstream end portion then substantially closes off the open exterior side of the housing defined between the exterior transverse edges of the blades. The unloading is carried out on the unloading length by a pusher lifting the sausages, and by a gripping head, for example of the sucker type, mounted on a robot, able to grip the batches of sausages in order to transfer them into receptacles.

According to another variant embodiment, the housing conveyor comprises two main return members, the feed conveyor then being arranged perpendicular at one of the two return members. The feed conveyor has a main top length portion carrying the sausages as before, and a downstream end portion of an inclined length, substantially closing off the open exterior side of the housing, and having an inclined surface against which the sausages come into abutment. The two return members can also be moved in a to-and-fro movement in order to effect the unloading at rest of batches in receptacles, the feed conveyor then moving with the loading station.

Although the invention has been described in relation to a particular embodiment, it is obvious that it is in no way limited thereto and that it comprises all technical equivalents of the means described as well as combination thereof if they come within the scope of the invention.

What is claimed:

1. Device for forming batches of products intended to be loaded in receptacles, comprising
    a first housing conveyor of a housing type comprising two endless belts guided on return members with horizontal rotation axes, on a circulation path, and carrying a plurality of blades defining housings between them, each housing being able to be loaded with at least one product at a loading station in the circulation path and be unloaded at a unloading station in the circulation path, and drive means able to drive said belts along the circulation path,
    a second feed conveyor, of a feed type, with an endless belt, comprising a first endless belt able to transport products separated from one another and one behind the other, and to bring one or more products in each housing on the first housing conveyor at the loading station, and second drive means able to drive said first endless belt, and
    unloading means able to simultaneously unload a batch of products from successive housings on the first housing conveyor at the unloading station, in order to load them in a receptacle,
    wherein said second feed conveyor is arranged substantially perpendicular to the first housing conveyor and is able to bring the products in the housings through an open lateral side of said housings,
    wherein the first housing conveyor being equipped with stop means able to be arranged on a lateral side of the housing opposite to the second feed conveyor when one or more products are loaded in said housing, to serve as a stop for said product or products to be loaded in each housing;
    wherein the device comprises a third discharge conveyor of a discharge type, with an endless belt arranged under the discharge station and under the first housing conveyor, said third discharge conveyor being parallel or perpendicular to the first housing conveyor, intended to receive the batches of products on its top length; and
    wherein the stop means comprises a plate which is mounted fixedly on one support of the first housing conveyor and being inserted at the unloading station in slots of the blades.

2. Device according to claim 1, wherein the unloading means comprise a pusher able to pass through the open interior sides of the housings in order to push the products.

3. Device according to claim 1, wherein it comprises a sensor able to detect a product unloaded from the second feed conveyor, the means of driving the belts of the first housing conveyor being slaved to said sensor.

4. Device according to claim 1, wherein the third discharge conveyor comprises two longitudinal rails offset transversely from each other and two second endless belts mounted between upstream and downstream return wheels with vertical rotation axes.

5. Device according to one of claims 1 to 3, wherein the plate is adjustable in transverse position in the slots of blades corresponding to various transverse positions of the plate.

6. Device according to claim 1 wherein said second feed conveyor comprises a downstream end portion of a length extending between the two belts of the housing conveyor, so that each product is driven positively in a housing, until it comes into abutment against the stop means.

7. Device according to claim 6, wherein the first housing conveyor comprises the belts guided on a circulation path in a triangle between two main return members and an intermediate return member, the loading station being defined at said inter mediate return member, the second feed conveyor being able to bring the products into the housings when they pass over the intermediate return member, and in that said intermediate return member is arranged above the main return members, said intermediate return member comprising, for each belt, an intermediate wheel, the second feed conveyor comprising a main top length portion arranged substantially parallel to the rotation axes of the intermediate wheels, said downstream end portion being arranged between the two return wheels.

8. Device according to claim 7, wherein the second feed conveyor comprises a single endless belt the top length of which comprises said main portion and said downstream end portion.

9. Device according to claim 7 wherein the second feed conveyor also comprises two second endless belts, mounted between return wheels with vertical rotation axes, functioning in synchronism with the first belt, and having lateral lengths facing each other, close to the downstream main roller, able to grip the products.

10. Device according to claim 1, wherein a filling station is defined at a return member, the blades being fixed rigidly to the belts so that the two successive blades of a housing separate from each other when the belts pass over said return member, in order to open the housing and thus facilitate the insertion of one of more products.

11. Device according to claim 10, wherein the blades of a housing are able to grip the product or products loaded in the housing after the belts pass over the return members.

12. Device according to claim 10, wherein the first housing conveyor comprises the belts guided on a circulation path in a triangle between two main return members and an intermediate return member, the loading station being defined at said intermediate return member, the second feed conveyor being able to bring the products into the housings when they pass over the intermediate return member.

13. Device according to claim 12, wherein the housing conveyor comprises a rectilinear unloading length defined between the two main return members, said first housing conveyor comprising movement means able to move said main return members in a to-and-fro movement, parallel to the unloading length.

14. Device for forming batches of products intended to be loaded in receptacles, comprising
   a first conveyor of the housing type comprising two endless belts guided on return members with horizontal rotation axes, on a circulation path, and carrying a plurality of blades extending through a first longitudinal direction, said blades defining housings between them, each housing being able to be loaded with at least one product at a loading station in the circulation path and be unloaded at a unloading station in the circulation path, and drive means able to drive said belts along the circulation path,
   a second feed conveyor, with an endless belt, comprising a first endless belt able to transport products separated from one another and one behind the other, and to bring one or more products in each housing on the first housing conveyor at the loading station, and second drive means able to drive said first endless belt, and
   unloading means able to simultaneously unload a batch of products from successive housings on the first housing conveyor at the unloading station, in order to load them in a receptacle,
   wherein said second feed conveyor is arranged substantially perpendicular to the housing conveyor and is able to bring the products in the housings through a first open lateral side of said housings, said second feed conveyor comprising a main top length portion arranged substantially parallel to the first longitudinal direction of the blades forming a housing having its open lateral side in the face of the main top length
   wherein the housing conveyor being equipped with stop means able to be arranged on a second open lateral side of the housing opposite to the second feed conveyor when one or more products are loaded in said housing through the first open lateral side of the housing, to serve as a stop for said product or products to be loaded in each housing
   wherein the device comprises a third discharge conveyor, with an endless belt arranged under the first housing conveyor said third discharge conveyor being parallel or perpendicular to the first housing conveyor, intended to receive the batches of products on its top length,
   wherein the third discharge conveyor comprises two longitudinal rails offset transversely from each other and two second endless belts mounted between upstream and downstream return wheels with vertical rotation axes.

15. Device according to claim 2 or 14, wherein the first housing conveyor comprises a first endless belt comprising a top length extending under the unloading length and being parallel to the latter.

* * * * *

UNITED STATES PATENT AND TRADEMARK OFFICE
CERTIFICATE OF CORRECTION

PATENT NO. : 9,499,352 B2
APPLICATION NO. : 13/502516
DATED : November 22, 2016
INVENTOR(S) : Jacques Le Paih, Laurent Le Goff and Fabrice Le Pabic It is certified that error appears in the above-identified patent and that said Letters Patent is hereby corrected as shown below:

On the Title Page

Column 1, (73) Assignee:
DELETE: "MAREL STORK FOOD SYSTEMS FRANCE SAS, Baud (FR)"
ADD: --MAREL FRANCE, Baud, (FR)--

Signed and Sealed this
Eighteenth Day of April, 2017

Michelle K. Lee
*Director of the United States Patent and Trademark Office*